United States Patent [19]

Nanjo et al.

[11] Patent Number: 4,694,465
[45] Date of Patent: Sep. 15, 1987

[54] APPARATUS FOR AUTOMATICALLY CHARGING SCRAP INTO AN ARC FURNACE

[75] Inventors: Toshio Nanjo, Itabashi; Fumio Tomizawa, Yokohama, both of Japan

[73] Assignee: Ishikawajima-Harima Jukogyo Kabushiki Kaisha, Tokyo, Japan

[21] Appl. No.: 833,599

[22] Filed: Feb. 27, 1986

Related U.S. Application Data

[63] Continuation-in-part of Ser. No. 626,243, Jun. 29, 1984.

[30] Foreign Application Priority Data

Nov. 16, 1983 [JP] Japan .................. 58-215791

[51] Int. Cl.[4] ............................................. F27D 3/06
[52] U.S. Cl. ............................................... 373/81
[58] Field of Search ............... 373/80, 81, 9; 414/147, 414/154, 160, 179, 199; 432/239; 266/176, 184

[56] References Cited

U.S. PATENT DOCUMENTS 4,506,370 3/1985 Yoshimatsu ..................... 373/80

OTHER PUBLICATIONS

C. Selig et al, "High Speed Melting on an Old Gantry Furnace at SMI and Design Criteria for Its Modern Melt Shop", *Electric Furnace Proceeding*, vol. 40, 1982, pp. 391, 400 and 401.

D. J. Chee-Hing et al, "The New ISCOTT Meltshop in Trinidad", *Electric Furnace Proceeding*, vol. 39, 1981, pp. 48, 50 and 51.

B. Strohmeier, "Operation of UHP-Arc Furnaces at South African Iron and Steel Ltd.", Electric Furnace Proceeding, vol. 39, 1981, pp. 156, 157 and 158.

Krupp Stahlwerke Sudwestfalen AG et al., "Design and Startup of UHP Arc Furnace with Process Control for the Production of Specialty Steel" (Krupp, West Germany), World Steel & Metalworking, 79, pp. 51 and 52.

V. J. Pongia, "Start-Up of 150-Ton Electric Arc Furnace at Lukens", Iron and Steel Engineer, Dec. 1975, pp. 36, 37 and 38.

*Primary Examiner*—Roy N. Envall, Jr.

[57] ABSTRACT

An apparatus for automatically charging scrap into an arc furnace wherein an inactive position at which a scrap bucket charged with the scrap is normally placed is provided adjacent to the arc furnace; a transport mechanism is provided so that the scrap bucket is moved between said position and the arc furnace; and the scrap bucket is brought to and stopped at a position right above the arc furnace so as to charge immediately the scrap into the arc furnace within a short time and without overflowing.

3 Claims, 7 Drawing Figures

APPARATUS FOR AUTOMATICALLY CHARGING SCRAP INTO AN ARC FURNACE

This is a continuation in part of Ser. No. 626,243 filed June 29, 1984 now abandoned.

BACKGROUND OF THE INVENTION

The present invention relates to an apparatus for automatically charging scrap into a steel-making arc furnace.

As shown in FIG. 1, when conventionally scrap a is to be charged into an arc furnace b, a scrap bucket d is moved by a large overhead scrap-charging crane c to the position right above the arc furnace b. In this case, the view of a crane operator e is very limited due to dusty air, smoke and so on above and around the arc furnace b; but in response to a signal transmitted from an operator g on a floor f, the crane operator e must accomplish the fine alignment between the bucket d and the arc furnace b and the fine level adjustment of the bucket d with respect to the arc furnace b. Thereafter the scrap a is charged into the arc furnace b.

However, the prior art method described above has some problems.

(i) In response to the signals transmitted from the floor operator e, the crane operator g must inch the bucket d so that the bucket d is aligned with the arc furnace b. As a result, a long time is required for charging the scrap a into the arc furnace b. That is, the tap-to-tap time is increased so that high productivity cannot be attained. In addition, a furnace roof (not shown in FIG. 1) must be opened for a long time so that a large quantity of heat escapes from the furnace b into the surrounding atmosphere. That is, heat loss is high.

(ii) When the bucket d and the arc furnace b are not correctly aligned with each other, part of the scrap a to be charged falls out of the arc furnace b or the scrap a is accumulated around the top end h of the arc furnace b. As a result, the floor operator g must manually charge the spilled scrap a' and the accumulated scrap a" into the arc furnace b. Therefore a long time is required before the furnace roof is closed and the electrodes (not shown) are powered on. That is, the tap-to-tap time is increased as is the case in (i) so that the high productivity cannot be attained.

The present invention was made to overcome the above and other problems encountered in the prior art system for charging scrap into an arc furnace and has for its object to provide an apparatus for automatically charging scrap into an arc furnace within a short time without overflowing scrap and without accumulating scrap on the top end of the arc furnace so that labor saving and energy saving can be attained and the productivity can be improved.

DETAILED DESCRIPTION OF THE PREFERRED EMBODIMENTS

Figure 2:
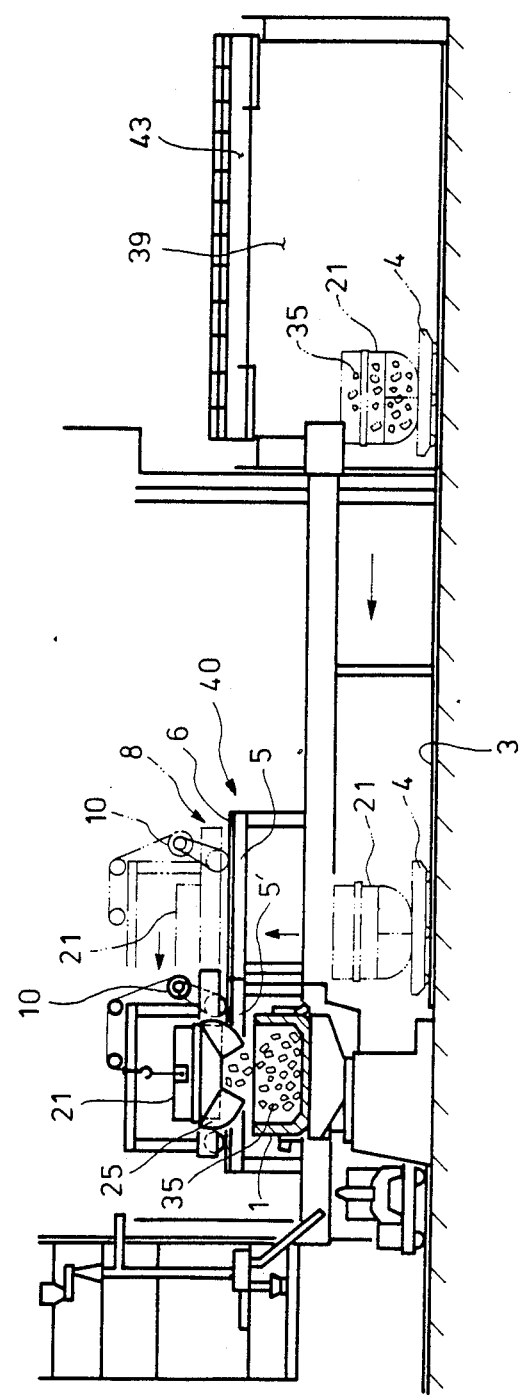
FIG. 2 is a schematic view of a first embodiment of the present invention.

A first embodiment of the present invention will be described in conjunction with FIG. 2. A scrap bucket 21, which is loaded with scrap 35 in a scrap yard 39, is transferred by a bucket car 4 along rails 3 into a position below a stand-by position 40 of a bucket carriage 8 adjacent to an arc furnace 1. An electrically driven winch drum 10 on the carriage 8 is actuated to wind up the bucket 21 to the stand-by position 40. As soon as needed in the arc furnace 1, the bucket 21 is transferred along guide rails 6 which extend between beams 5 at the stand-by position 40 and beams 5' above the furnace 1, and is automatically stopped just above the furnace 1 by a limit switch (not shown). Then, a clamshell type bucket gates 25 of the bucket 2 is opened to charge the scrap 35 into the furnace 1. After the scrap 35 has been charged, the bucket 21 is returned onto the bucket car 4 in the reversed manner and is transferred to the scrap yard 39 for loading of scrap.

Figure 1:
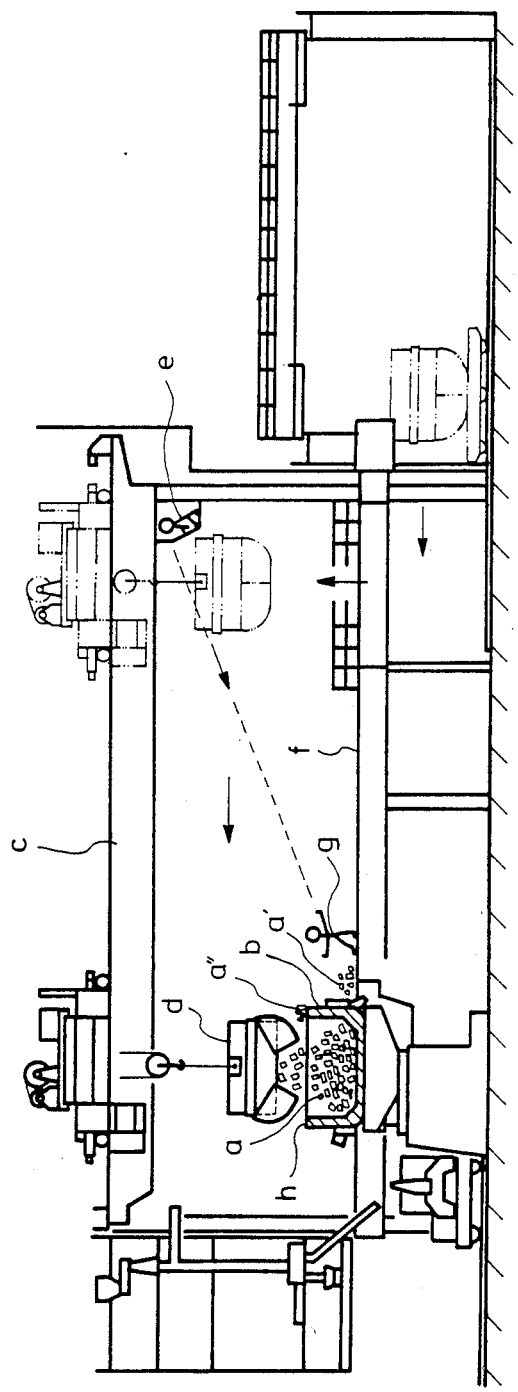
FIG. 1 is a schematic view of a prior art system for charging scrap into an arc furnace.

According to the scrap-charging apparatus of the present invention, not only a large overhead crane c as shown in FIG. 1 is eliminated but also the charging of the scrap into the arc furnace 1 in a short time is assured without part of the scrap being fallen out of the furnace, so that steel-making productivity of the furnace is enhanced. Moreover, elimination of a large overhead crane allows that a steel foundry including the furnace may be low in height and weak in structural strength and may have smaller pillar foundations; these are drastically advantageous from ecomonical viewpoint.

Figure 3:
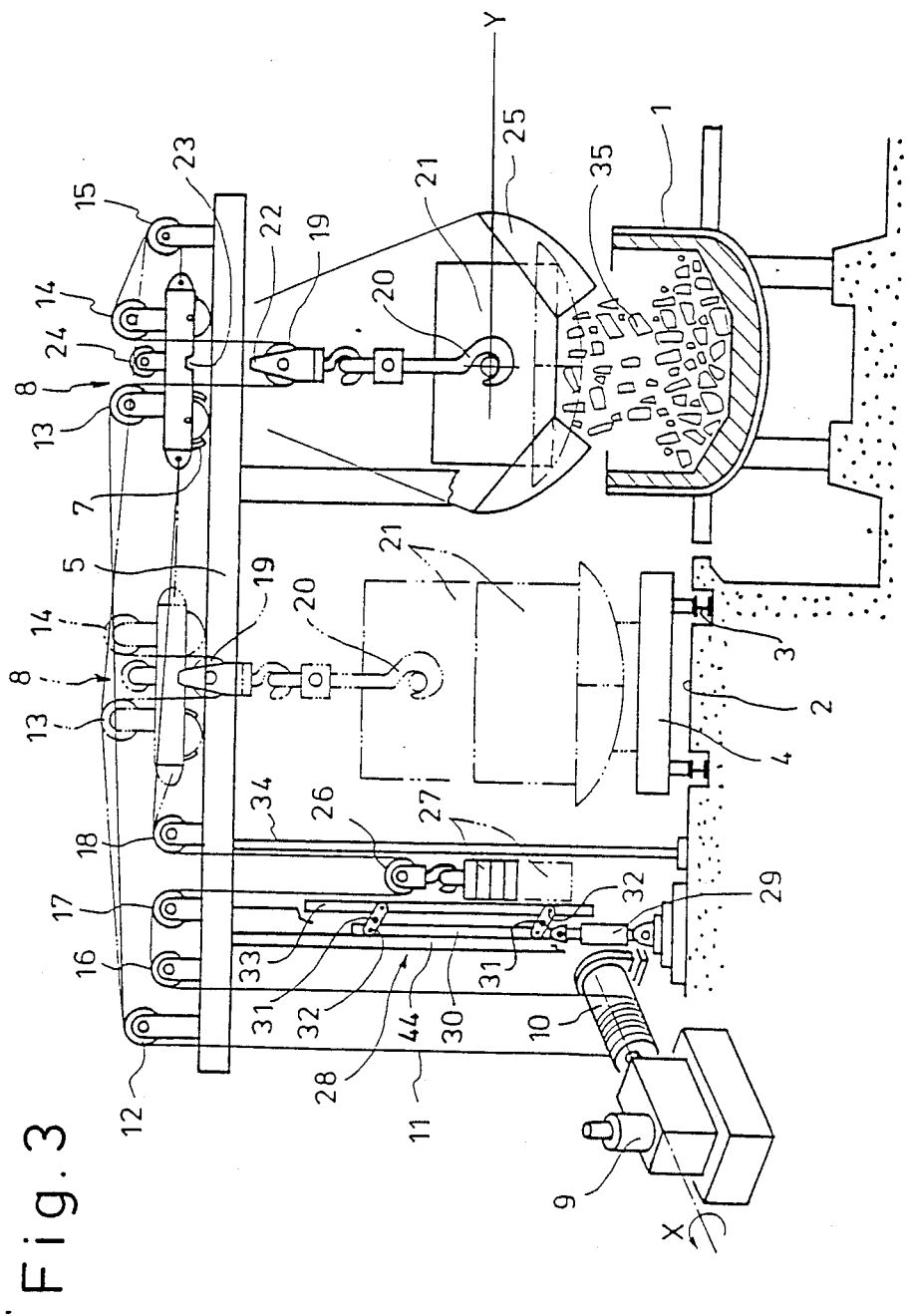
FIG. 3 is a schematic view of a second embodiment of the present invention.
Figure 4:
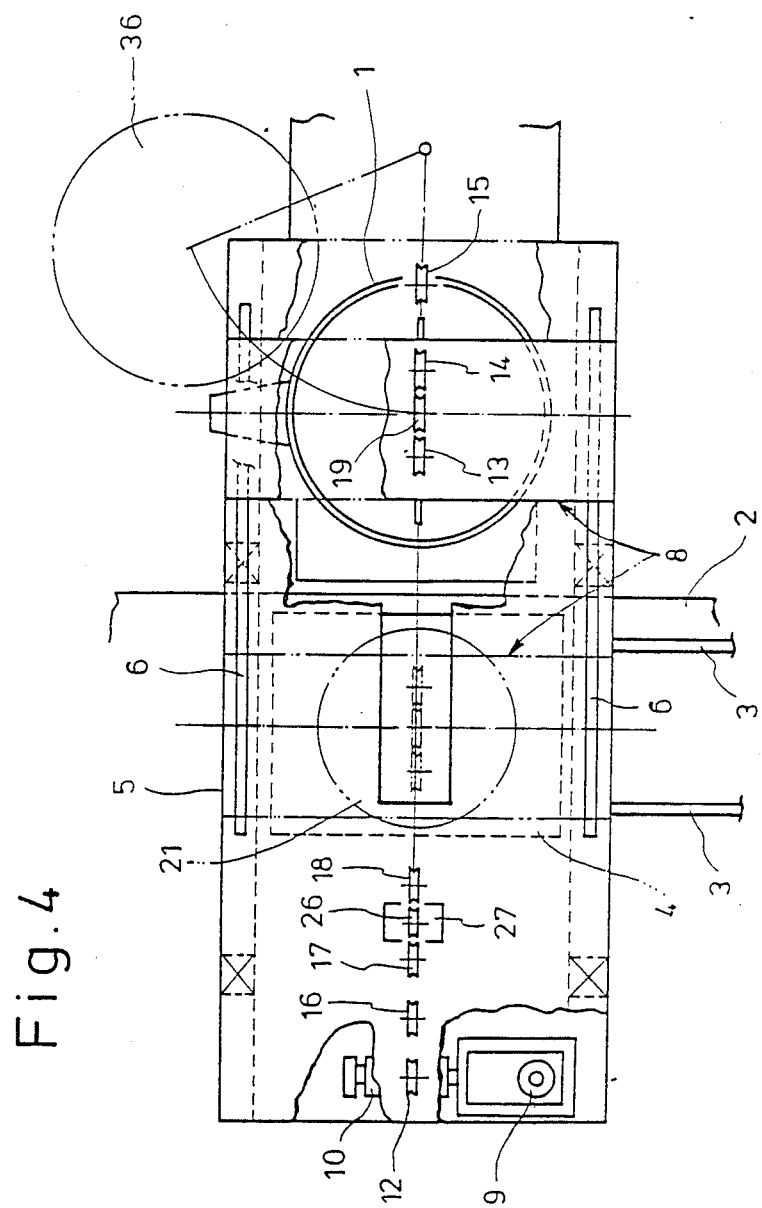
FIG. 4 is a top view, partly in section, thereof.

Referring to FIGS. 3 and 4, a second embodiment of the present invention will be described. A bucket car 4 rides on a pair of parallel rails 3 laid on an operation floor 2 adjacent to an arc furnace 1. As seen in a top view shown in FIG. 3, a structure including beams 5 extends above the arc furnace 1 and the rails 3 such that the axis of the beams 5 intersects extensions of the axes of the arc furnace 1 and the rails 3 at right angles. A bucket carriage 8 with a brake 7 rides on guide rails 6 which in turn are laid on the beams 5.

A winch drum 10 which is driven by a motor 9 is disposed at a suitable position on the foundation floor 2. One end of a rope 11 wound on or off by the winch drum 10 passes over a sheave 12 disposed at one end (that is, the end remote from the arc furnace 1) of the beams 5, a sheave 13 disposed on the bucket carriage 8, a hook sheave 19, a sheave 14 disposed on the bucket carriage 8 and a sheave 15 disposed at the other end (that is, the end adjacent to the arc furnace 1) of the beams 5 and is connected to the front (right in FIG. 3) end of the bucket carriage 8. The other end of the rope 11 wound off or on by the drum 10 passes over sheaves 16 and 17, a guide sheave 26 and a sheave 18 and is connected to the rear (left in FIG. 3) end of the bucket carriage 8, the sheaves 16, 17 and 18 being disposed on the beams 5. Therefore, as the winch drum 10 is rotated by the motor 9, the rope 11 is wound and unwound so that the bucket carriage 8 moves along the guide rails 6 on the beams 5. There is provided a limit switch (not shown) which is actuated when the bucket carriage 8 is brought to the position right above the arc furnace 1 so that the motor 9 is turned off to stop the bucket carriage 8.

The hook sheave 19 is located between the sheaves 13 and 14 disposed on the bucket carriage 8 and a hanging device e.g. a hook 20 is suspended from the hook sheave 19 so as to suspend a scrap bucket 21. The lower or bottom surface of the bucket carriage 8 is formed with a recess 23 which is adapted to receive therein a stopper 22 extended upwardly from the upper end of the frame of the hook sheave 19. As a result, when the stopper 22 engages with the recess 23 of the bucket carriage 8, the further upward movement of the hook 20 is prevented. The recess 23 is provided with a rope tension sensor (not shown) which is adapted to detect the tension of the rope 11 after the stopper 22 is received in the recess 23 and in response to the signal from the rope tension sensor, the motor 9 is turned off. An auxiliary winch 24 for opening or closing clamshell type bucket gates 25 of the scrap bucket 21 is mounted on the bucket carriage 8.

The guide sheave 26 is located between the sheaves 17 and 18 and a balance weight 27 is suspended from the guide sheave 26. A balance weight arresting device generally indicated by reference numeral 28 is disposed adjacent to the balance weight 27. The balance weight arresting device comprises an air cylinder 29 vertically disposed on the foundation floor 2, a rod 30 having its lower end connected to the piston rod of the air cylinder 29, and links 32 pivoted respectively at their midpoints by pins 31 to a stationary frame (not shown) and having their one ends pivoted respectively to upper and lower ends of the rod 30. The arresting device also has a stopper plate 33 pivoted to the other ends of the links 32 and extending parallel with the rod 30, and an arresting plate 34 extending vertically between the foundation floor 2 and the beams 5 in parallel with the stopper plate 33 and spaced apart from the latter by a predetermined distance in the horizontal direction so that the balance weight 27 is located between the stopper plate 33 and the arresting plate 34. It is seen that the rod 30, the links 32 and the stopper plate 33 make up a parallel linkage so that when the piston rod of the air cylinder 29 is extended or retracted, the stopper plate 33 is moved away or toward the arresting plate 34. It follows therefore that when the piston rod of the air cylinder 29 is retracted, the stopper plate 33 is moved toward the arresting plate 34 so that the balance weight 27 is clamped between them. Reference numeral 36 indicates a furnace roof (see FIG. 4).

Next the mode of operation of the second embodiment with the above-described construction will be described. First the bucket 21 which is charged with the scrap 35 is mounted on the bucket car 4 which in turn is stopped at a position adjacent to the arc furnace 1. The charging of the scrap 35 into the arc furnace 1 is carried out in the manner to be described below. First, the motor 9 is driven so that the winch drum 10 is rotated in the counterclockwise direction X in FIG. 3 so that the bucket 21 is lifted. As the bucket 21 is lifted, the stopper 22 at the upper end of the frame of the hook sheave 19 which suspends the hook 20 engages with the recess 23 of the bucket carriage 8. When the stopper 22 is completely received in the recess 23 of the bucket carriage 8, further lifting of the bucket 21 is prevented. As a result, tension is exerted on the rope 11 and in response to the signal from the rope tension sensor, the motor 9 is turned off so as to stop the lifting of the bucket 21. When the bucket 21 is lifted or lowered, the brake 7 of the bucket carriage 8 is applied so that the bucket carriage 8 can be held stationary on the guide rails 6 of the beams 5. In this case the balance weight arresting device 28 is left released so that the balance weight 27 is maintained free. As a result, the balance weight 27 is lowered to the position indicated by the dot-dash lines in FIG. 3 so that the rope 11 is under tension. As a result, when the winch drum 10 is rotated in the counterclockwise direction X, the hook sheave 19 is lifted so that the bucket 21 is also lifted.

When the bucket 21 is lifted to its uppermost position in the manner described above, the brake 7 of the bucket carriage 8 is released and the piston rod of the air cylinder 29 is retracted so that the balance weight 27 is arrested between the stopper plate 33 and the arresting plate 34 and consequently held stationary. When the winch drum 10 is rotated in the counterclockwise direction X again, the rope 11 whose one end is connected to the front end of the bucket carriage 8 is wound around the winch drum 10 so that the bucket carriage 8 is moved toward the arc furnace 1. When the bucket carriage 8 is brought to the position right above the arc furnace 1, the limit switch (not shown) is actuated so that the motor 9 is turned off and consequently the bucket carriage 8 is stopped. It is apparent that in this case, the rope 11 whose other end is connected to the rear end of the bucket carriage 8 is unwound from the winch drum 10 by a length equal to the movement of the bucket carriage 8.

Figure 7:
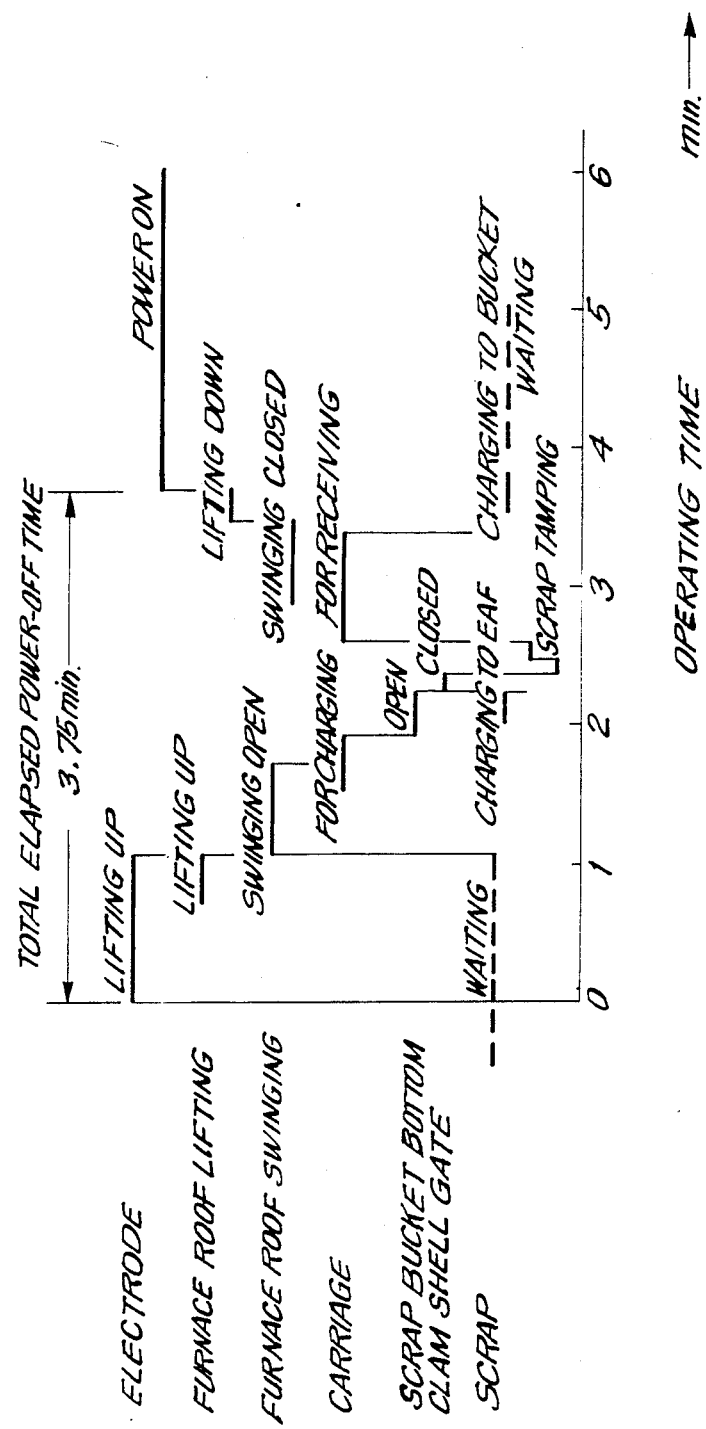
FIG. 7 is a time schedule of scrap charging under actual operating conditions.

Thereafter the auxiliary winch 24 is wound up to wide open the gates 25 of the bucket 21 so that the scrap 35 is charged into the arc furnace 1 (see FIG. 7).

If necessary, the scrap is tamped down with the scrap bucket 21, which is moved up and down by the motor 9 rotated in the clockwise and counterclockwise directions. When the carriage 8 starts to move away from the furnace, the furnace roof 36 starts to swing on. While the scrap bucket travels to the position adjacent to the arc furnace 1 and receives scrap, the furnace roof 36 complete swing on, is lowered into melting position, and the power is put back on. Total elapsed power-off time is below four (4) minutes per charge instead of five(5) to six (6) minutes per charge in an ordinary way.

More specifically, when the motor 9 is turned off, the brake 7 of the bucket carriage 8 is applied and the balance weight arresting device 28 is released so that the balance weight 27 is released. That is, the balance weight 27 is now free to be lifted or lowered. Next the winch drum 10 is rotated in the clockwise direction or direction opposite to the direction indicated by the arrow X. Then, the bucket 21 is lowered and weighted down the charged scrap. The scrap is tamped down with the scrap bucket 21. In this case, the balance weight 27 is lifted to the position indicated by the solid line in FIG. 2.

After the scrap 35 has been charged into the arc furnace 1, and, if necessary, the scrap 35 has been tamped down with the scrap bucket, the above-described steps are reversed so that the scrap bucket 21 is loaded again on the bucket car 4. More particularly, the gates 25 of the bucket 21 are closed and the bucket 21 is lifted until the stopper 22 at the upper end of the frame of the hook sheave 19 engages with the recess 23 of the bucket carriage 8. Thereafter the bucket carriage 8 is moved toward the position right above the bucket car 4 and the bucket 21 is lowered and loaded on the bucket car 4. Then the bucket carriage 8 is slightly moved toward the arc furnace 1 so that the hook 20 is released from the bucket 21. Thereafter the hook 20 is lifted to its uppermost position. The bucket 21 which is now emptied is moved by the bucket car 4 toward a predetermined position where the empty bucket 21 is removed from the bucket car 4 while a new bucket which has been charged with the scrap by a scrap bucket crane or the like (not shown) is loaded on the bucket car 4. Then the bucket car 4 is brought to the position adjacent to the arc furnace 1 so that the new charge of scrap 35 may be charged into the arc furnace 1 in the manner described above.

Figure 5:
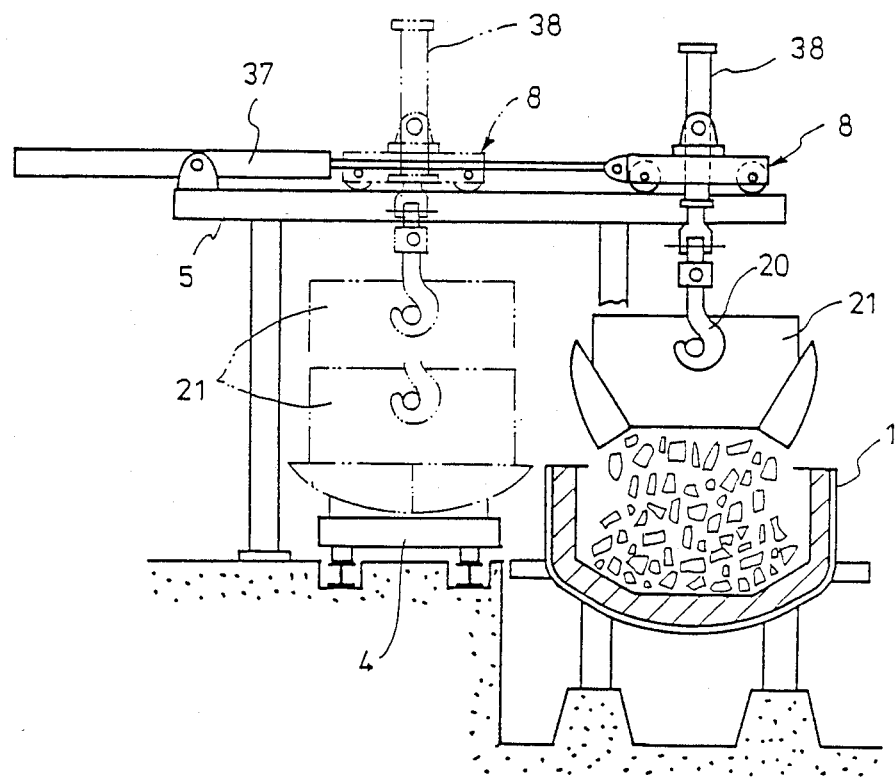
FIG. 5 is a schematic side view of a third embodiment of the present invention.

FIG. 5 shows a third embodiment of the present invention. In the second embodiment described above with reference to FIGS. 3 and 4, the winch drum 10 is used to move the bucket carriage 8 and to lift or lower the hook 20, but in the case of the third embodiment as shown in FIG. 5, the bucket carriage 8 is moved by a hydraulic cylinder 37 disposed at one end of the beam 5 while the hook 20 is lifted by means of a hydraulic cylinder 38 disposed on the bucket carriage 8.

The third embodiment can attain new or improved results, functions or effects as the second embodiment described above. It is to be understood that instead of the hydraulic cylinders 37 and 38, electric winches may be used. Alternatively, a combination of hydraulic cylinders with electric winches may be used.

It is also understood that the present invention is not limited to the preferred embodiments described above and that various modifications may be effected without leaving the true spirit of the present invention. As a result, immediately after the bucket carriage 8 is stopped, the gates 25 of the scrap bucket 21 are opened to charge the scrap 35 into the arc furnace 1.

Figure 6:
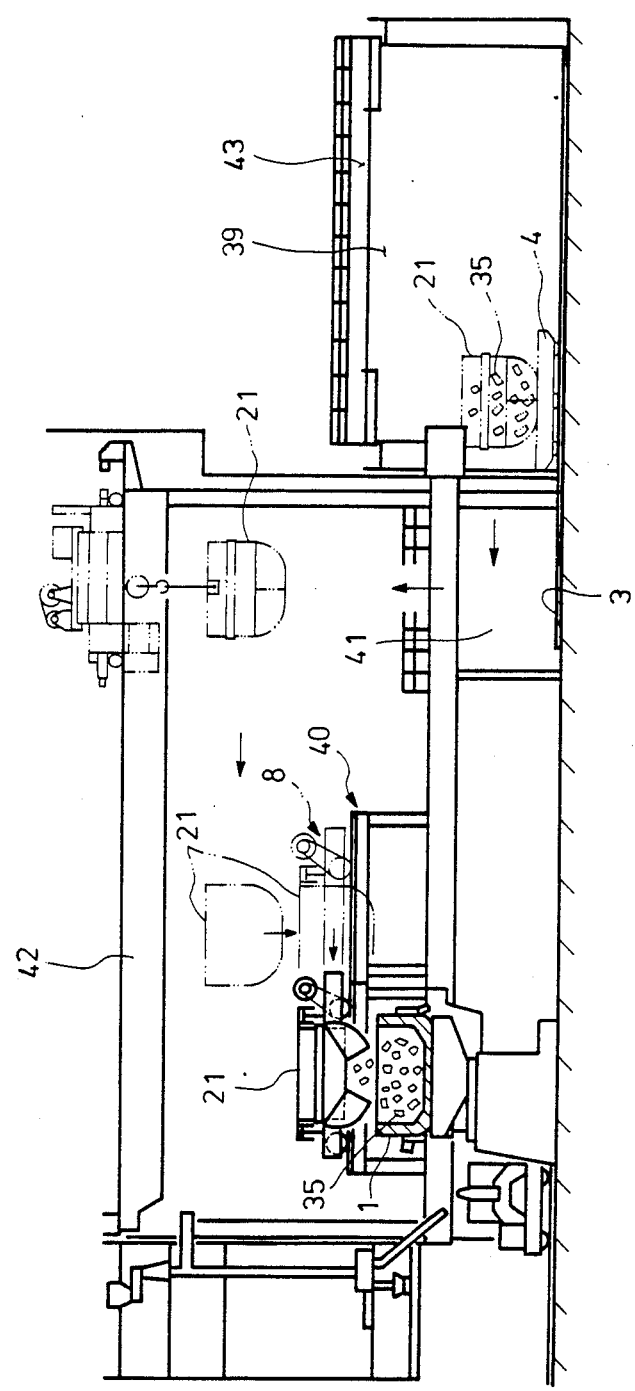
FIG. 6 is a schematic view of a fourth embodiment of the present invention.

FIG. 6 shows a fourth embodiment of the present invention. The scrap bucket 21, which is loaded with the scrap 35 in the scrap yard 39, is transferred by the bucket car 4 along the rails 3 into an arc furnace yard 41 and is lifted up by an arc-furnace-yard overhead crane 42 (these operations are the same as the prior art). Then, the scrap bucket 21 is loaded by the crane 42 onto the bucket carriage 8 at the bucket-carriage stand-by position 40 adjacent to the arc furnace 1. As soon as needed in the arc furnace 1, the scrap bucket 21 is traversed by the bucket carriage 8 into a position just above the arc furnace 1 and the scrap 35 is charged in the same manner as FIG. 2 embodiment.

The effects, features, and advantages of the present invention may be summarized as follows:

(I) The scrap bucket which is normally disposed adjacent to the arc furnace is automatically brought to the position right above the arc furnace. As a result, the scrap can be automatically charged into the arc furnace within a short period of time.

(II) The scrap bucket is brought to and stopped at the position right above the arc furnace with a higher degree of accuracy. As a result, the scrap can be charged into the arc furnace without spilling over and/or accumulating on the top end or rim of the arc furnace.

(III) As described above, according to the present invention, the scrap can be automatically and positively charged into the arc furace without spilling over. As a result, the tap-to-tap time is shortened so that high productivity is attained. For instance, when the present invention is applied to a UHP arc furnace, the tap-to-tap time of about 80 minutes (18 heats/day) can be reduced by four minutes. That is, the tap-to-tap time becomes about 76 minutes so that the arc furnace operation can be increased to about 19 heats/day. This means that the productivity can be increased by about 5.5%.

It is not necessary that a floor operator transmits the signals to a crane operator and it is further not needed that the floor operator manually charges the spilled accumulated scrap into the arc furnace. As a result, the floor operator can be eliminated.

(V) The time when the roof of the arc furnace is kept opened is shortened so that the transmission of the heat from the arc furnace to the surrounding atmosphere can be reduced to a minimum. As a result, the comsumption of electric power can be reduced.

(VI) The time required for charging the scrap into the arc furnace while the scrap bucket is suspended from the scrapcharging crane can be eliminated. In addition, when a suitable layout is designed, the scrap-charging crane itself can be eliminated.

(VII) Elimination of a large overhead crane allows that a steel foundry including the furnace may be low in height and weak in structural strength and may have smaller pillar foundation; these are drastically advantageous from economical viewpoint.

What is claimed is:

1. An apparatus for automatically charging scrap into a shroudless arc furnace, comprising: a scrap bucket open at the top, a bucket carriage on which said scrap bucket is loaded, said bucket carriage being normally positioned at a stand-by position which is adjacent to the arc furnace and which is at a height or level just sufficient for travel of the bucket to above the furnace for directly charging the scrap into the furnace, a structure including beams extended between said stand-by position and said arc furnace, said bucket carriage riding on said beams, and a mechanism for traversing said scrap bucket between said stand-by position and said are furnace.

2. An apparatus according to claim 1 wherein the traversing mechanism is winch means.

3. An apparatus according to claim 1 wherein the traversing mechanism is hydraulic cylinder means.

* * * * *